United States Patent
Xin et al.

(10) Patent No.: US 8,767,838 B1
(45) Date of Patent: Jul. 1, 2014

(54) CASCADING MULTIPLE VIDEO TRANSCODERS IN A VIDEO PROCESSING SYSTEM

(75) Inventors: Jun Xin, Mountain View, CA (US); Behzad R. Sayyah, Emerald Hills, CA (US); William K. Chan, Cupertino, CA (US)

(73) Assignee: Zenverge, Inc., Santa Clara, CA (US)

( * ) Notice: Subject to any disclaimer, the term of this patent is extended or adjusted under 35 U.S.C. 154(b) by 565 days.

(21) Appl. No.: 12/553,228

(22) Filed: Sep. 3, 2009

Related U.S. Application Data

(60) Provisional application No. 61/094,783, filed on Sep. 5, 2008.

(51) Int. Cl.
| | | |
|---|---|---|
| H04B 1/66 | (2006.01) | |
| H04N 7/12 | (2006.01) | |
| H04N 11/02 | (2006.01) | |
| H04N 11/04 | (2006.01) | |
| H04N 7/26 | (2006.01) | |

(52) U.S. Cl.
CPC ... H04N 19/00472 (2013.01); H04N 19/00533 (2013.01); *H04N 19/00* (2013.01)
USPC .................................................. 375/240.26

(58) Field of Classification Search
None
See application file for complete search history.

(56) References Cited

U.S. PATENT DOCUMENTS

| | | | | |
|---|---|---|---|---|
| 7,061,410 B1 * | 6/2006 | Pearson et al. | ................ | 341/107 |
| 7,236,526 B1 * | 6/2007 | Kitamura | ................ | 375/240.16 |
| 2002/0059643 A1 * | 5/2002 | Kitamura et al. | ............. | 725/136 |
| 2003/0016755 A1 * | 1/2003 | Tahara et al. | ............. | 375/240.25 |
| 2003/0128292 A1 * | 7/2003 | Kitamura et al. | ............. | 348/441 |
| 2003/0128766 A1 * | 7/2003 | Tahara et al. | ............. | 375/240.26 |
| 2005/0147172 A1 * | 7/2005 | Winger et al. | ........... | 375/240.23 |
| 2005/0147173 A1 * | 7/2005 | Winger et al. | ........... | 375/240.23 |
| 2006/0291570 A1 * | 12/2006 | Kitamura et al. | ........ | 375/240.28 |
| 2007/0030901 A1 * | 2/2007 | Joch et al. | ................. | 375/240.16 |
| 2007/0253488 A1 * | 11/2007 | Kitamura | ................. | 375/240.16 |
| 2007/0263719 A1 * | 11/2007 | Tahara et al. | ............. | 375/240.02 |
| 2008/0008237 A1 * | 1/2008 | Tahara et al. | ............. | 375/240.05 |
| 2008/0013625 A1 * | 1/2008 | Tahara et al. | ............. | 375/240.02 |
| 2008/0013626 A1 * | 1/2008 | Tahara et al. | ............. | 375/240.02 |
| 2008/0013627 A1 * | 1/2008 | Tahara et al. | ............. | 375/240.02 |
| 2008/0043839 A1 * | 2/2008 | Kitamura | ................. | 375/240.05 |
| 2008/0232464 A1 * | 9/2008 | Tahara et al. | ............. | 375/240.02 |

\* cited by examiner

*Primary Examiner* — Ayaz Sheikh
*Assistant Examiner* — Peter Chau
(74) *Attorney, Agent, or Firm* — Fenwick & West LLP

(57) ABSTRACT

A system (and a method) are disclosed for a video processing system cascading multiple transcoders. The system includes a first transcoder, a second transcoder and an optional third transcoder. The first transcoder is a pre-processing transcoder configured to preprocess an input video stream into a first bitstream in a first video format. The second transcoder is a primary transcoder configured to transcode the first bitstream into a second bitstream in a second video format. The third transcoder comprises a post-processing transcoder configured to further transcode the second bitstream into a third bitstream in a third video format. Pre-processing and post-processing the input video stream by the cascaded transcoders allows the system to more efficiently and quickly transcode the input video stream. Pre-processing and post-processing the input video further improves processing efficiency and speed and also increases throughout of coding processing.

18 Claims, 8 Drawing Sheets

400

Compressed H.264 CABAC stream 410

First Transcoder 420
- CABAC Decoder 422
- Picture Processing 424
- CAVLC encoder 426

CAVLC stream 427

Memory 206

Second Transcoder 430
- CAVLC Decoder 432
- Picture Processing 434
- MPEG-2 video entropy encoder 436

Transcoded MPEG-2 video stream 440

Figure 4

CASCADING MULTIPLE VIDEO TRANSCODERS IN A VIDEO PROCESSING SYSTEM

CROSS-REFERENCE TO RELATED APPLICATIONS

The present application claims priority under 35 U.S.C. §119(e) to U.S. Provisional Patent Application No. 61/094,783, filed on Sep. 5, 2008, entitled "EFFICIENT INTRA FRAMES VIDEO CODING" which is incorporated by reference in its entirety.

BACKGROUND

1. Field of Art

The disclosure generally relates to video compression, and more particularly, to cascading of multiple video transcoders in a video processing system.

2. Description of the Related Art

H.264 video coding standard includes several algorithmic improvements for hybrid motion compensated and discrete cosine transform (DCT) based video codecs. One aspect of the improvements is entropy coding. Entropy coding is a lossless compression technique. Typically, entropy encoders are used to compress data by assigning codes to each data symbol such that the most common symbols use the shortest codes. Efficient entropy coding is important for the overall coding performance of a video codec.

Entropy encoding is an example of lossless encoding that makes uses of the redundancy of video signals. Natural video signals show non-stationary statistical behavior. The statistics of these signals largely depend on the video content. Traditional video coding schemes rely on a mapping from the video signals to a bitstream of variable length-coded syntax elements, such as block types, motion vectors and quantized coefficients. The traditional video coding schemes exploit some of the non-stationary characteristics but not all of them. For example, entropy encoding in hybrid block-based video coding standards, such as MPEG-2, H.263 and MPEG-4, is generally based on fixed tables of variable length codes (VLC).

For transmitting quantized transform coefficients of video signals, a more efficient method called Context-Adaptive Variable Length Coding (CAVLC) is employed in H.264 video coding standard. In this scheme, VLC tables for various syntax elements are switched depending on already transmitted syntax elements. Since the VLC tables are designed to match the corresponding conditional statistics, the entropy coding performance is improved in comparison to schemes using a single fixed VLC table.

The efficiency of entropy coding can be improved further if Context-Adaptive Binary Arithmetic Coding (CABAC) is used. The CABAC design is based on the key elements of binarization, context modeling and binary arithmetic coding. The usage of arithmetic coding and adaptive codes permits CABAC adaptation to non-stationary symbol statistics. The context modeling is applied to a binary sequence of the syntactical elements of the video data, such as block types, motion vectors, and quantized coefficients. The context modeling of CABAC allows already coded syntax elements to be used to estimate conditional probabilities and the conditional probabilities are used for switching several estimated probability models to improve entropy coding efficiency.

For some applications, however, the computational requirements of CABAC may be too high given today's silicon technology. Therefore, H.264 coding standards specifies two alternative methods of entropy coding: a low-complexity technique based on the usage of CAVLC, and the computationally more demanding algorithm of CABAC.

MPEG standards introduced three frame types for video coding: intra frame (I frame), predicted frame (P frame) and bidirectional predicted frame (B frame). The different types of frames are organized together into a group of pictures (GOP). A GOP is the smallest random access unit in a video sequence. I and P frames are sometimes called anchor frames used for motion-compensated prediction in a group of pictures. B frames are predicted using anchor frames (e.g., I or P frames), and are not used to predict anchor frames. However, intra frames do not use temporal correlation for prediction, the compression rate of intra frames are usually low compared to P or B frames that make use of temporal correlation for prediction. In addition, to support random access, there are frequent I frames in a video sequence and it is typical to have two I frames per second. For example, for a compressed H.264 bitstream at bit rate of 9 Mbps, up to 4 Mbps may have been used for encoding intra frames.

CABAC offers higher compression efficiency than CAVLC at the expense of much higher computational complexity. Since CABAC encoding/decoding time for a picture is proportional to the number of bits it produces/receives, it uses more time for bigger pictures, typically I pictures, and less time for smaller pictures typically P and B pictures. For some applications, it is hard or even impossible with today's silicon technology to CABAC encode/decode a large picture in real time. On the other hand, in a typical video processing system, e.g. a video transcoder, the processing speed of other parts of the system, e.g., motion estimation, transform, intra prediction etc., do not depend on the picture size. Therefore CABAC encoding/decoding typically is very slow for large pictures, primarily I pictures, so that the video processing for such large picture becomes slow as well. For smaller pictures, primarily P and B pictures, CABAC runs faster than the other video processing components. However, the processing speed in this latter case is determined by other video processing components, not by CABAC. Therefore, in an H.264 video processing system, CABAC encoding/decoding speed for large pictures can become a performance bottleneck.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 is an example of the video processing system illustrated in FIG. 1 for transcoding a compressed H.264 CABAC stream into a MPEG-2 video stream by pipelining two transcoders.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Pipelined Video Processing Configuration

One embodiment of a disclosed system (and a method) includes a plurality of video transcoders cascaded with each other in a video processing system. A first transcoder is configured to transcode an input video stream in its native video format into a first bitstream in a first video format. A second transcoder is configured to transcode the first bitstream in the first video format into a second bitstream in a second video format, and optionally a third transcoder is configured to transcode the second bitstream in the second video format into a third bitstream in a third video format. The disclosed system not only speeds up the overall entropy coding performance of the video processing system, but also allows higher throughput of coding processing.

Figure 1:
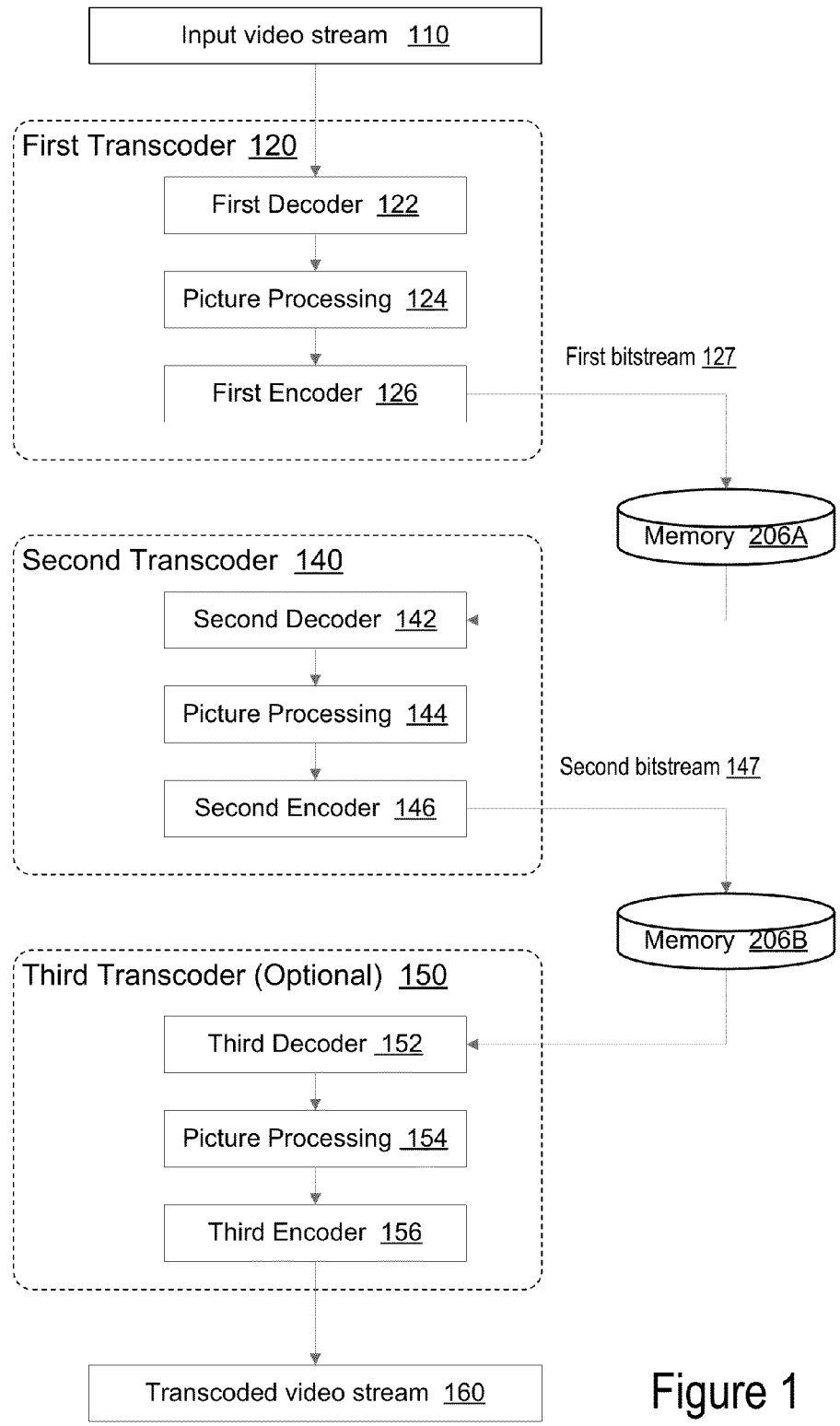
FIG. 1 is a high-level diagram illustrating a pipelined video processing configuration of a video processing system according to one embodiment.

FIG. 1 is a high-level diagram illustrating a pipelined video processing configuration of a video processing system 100 according to one embodiment. Generally, the video processing system 100 comprises a first transcoder 120, a second transcoder 140 and an optional third transcoder 150. The first transcoder 120 couples the second transcoder 140, which couples the optional third transcoder 150. The first transcoder 120 is a pre-processing transcoder configured to preprocess an input video stream 110 into a first video stream (also called a first bitstream) in a first video format. The second transcoder 140 is a primary transcoder configured to transcode the first bitstream pre-processed by the first transcoder 120 into a second bitstream in a second video format. Pre-processing the input video stream 110 by the first transcoder 120 allows the second transcoder 140 to more efficiently and quickly transcode the input video stream 110 into the second bitstream in the second video format.

As noted, the video processing system 100 optionally includes a third transcoder 150. The third transcoder 150 comprises a post-processing transcoder that is configured to further transcode the second bitstream processed by the second transcoder 140 into a third bitstream in a third video format. Post-processing the video stream from the second transcoder 140 further improves processing efficiency and speed and also increases throughout of coding processing.

Referring back more specifically to the first transcoder 120, it comprises a first decoder 122 configured to decode the input video stream 110 in its native video format, a picture processing unit 124 configured to process the decoded input video stream 110, and a first encoder 126 configured to encode the processed input video stream 110 into a first bitstream 127 in a first video format. The second transcoder 140 comprises a second decoder 142 configured to decode the first bitstream 127 in the first video format, a picture processing unit 144 configured to process the decoded first bitstream 127, and a second encoder 146 configured to encode the processed first bitstream 127 into a second bitstream 147 in a second video format. The second decoder 142 of the second transcoder 140 is a corresponding decoder of the first encoder 126 of the first transcoder 120.

The third transcoder 150 comprises a third decoder 152 configured to decode the second bitstream 147 in the second video format, a picture processing unit 154 configured to process the decoded second bitstream 147, and a third encoder 156 configured to encode the processed second bitstream 147 into a transcoded video stream 160. The third decoder 152 of the third transcoder 150 is a corresponding decoder of the second encoder 146 of the second transcoder 140.

The video processing system 100 also comprise one or more data storage units, such as memory 206A-B. The memory 206 is, for example, any computer-readable/writable storage medium, such as a random access memory (RAM), hard drive, writable DVD, or a solid-state memory device. The memory holds instructions and data used by the encoders, decoders or the picture processing units of the video processing system 100. For example, in one embodiment, the first transcoder 120 stores the first bitstream 127 encoded by the first encoder 126 in the memory 206A. The second transcoder 140 retrieves the first bitstream 127 from the memory 206A and generates the second bitstream 147. Similarly, the second transcoder 140 stores the second bitstream 147 encoded by the second encoder 146 in the memory 206B. The third decoder 152 retrieves the second bitstream 147 from the memory 206B and further processes the second bitstream 147.

Although the transcoders (120, 140 and 150) are shown in FIG. 1 as three individual transcoders for ease of discussion and understanding, but is not intended to be so limiting. For example, an alternative embodiment may comprise one configurable transcoder running on the video processing system 100. The configurable transcoder may be located in one physical chipset and is configured to first perform the functionality of the first transcoder 120, and is further configured to perform the functionalities of the second transcoder 140 and the optional third transcoder 150 during the different phases of transcoding the input stream 110. It is noted that the example configurations discussed herein could be similarly configured.

An Exemplary Computing System for the Video Processing System

Figure 2:
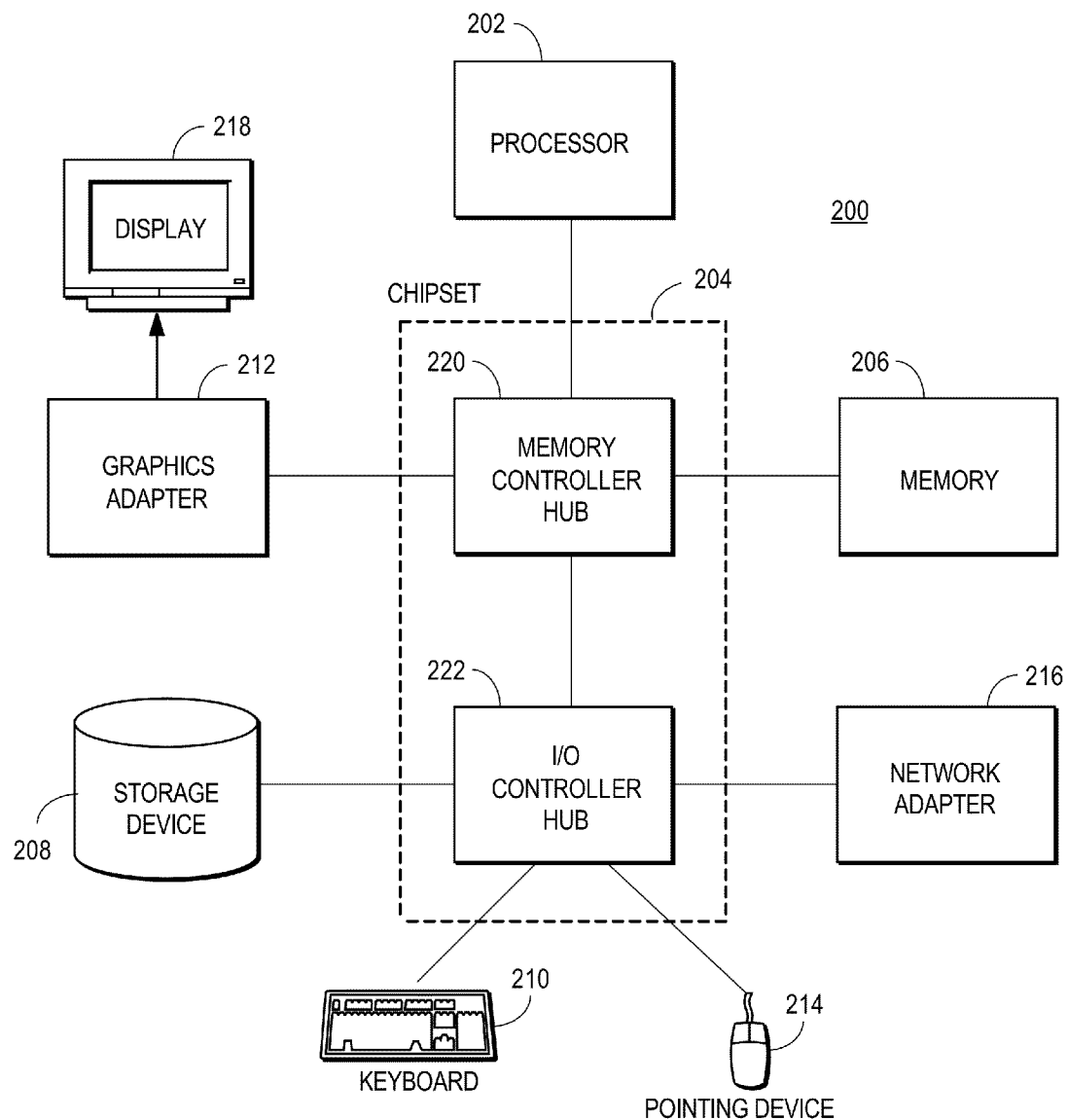
FIG. 2 is a high-level block diagram of a computer for acting as a video encoder, a video decoder, or a picture processing unit according to one embodiment.

FIG. 2 is a high-level block diagram of a computer 200 for acting as the various decoders (122, 142 or 152), the various encoders (126, 146 or 156) or the various processing units (124, 144 or 154) of the video processing system 100 according to one embodiment. Illustrated are at least one processor 202 coupled to a chipset 204. Also coupled to the chipset 204 are the memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a reputation server 140 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Example Video Processing System Configurations

Figure 3:
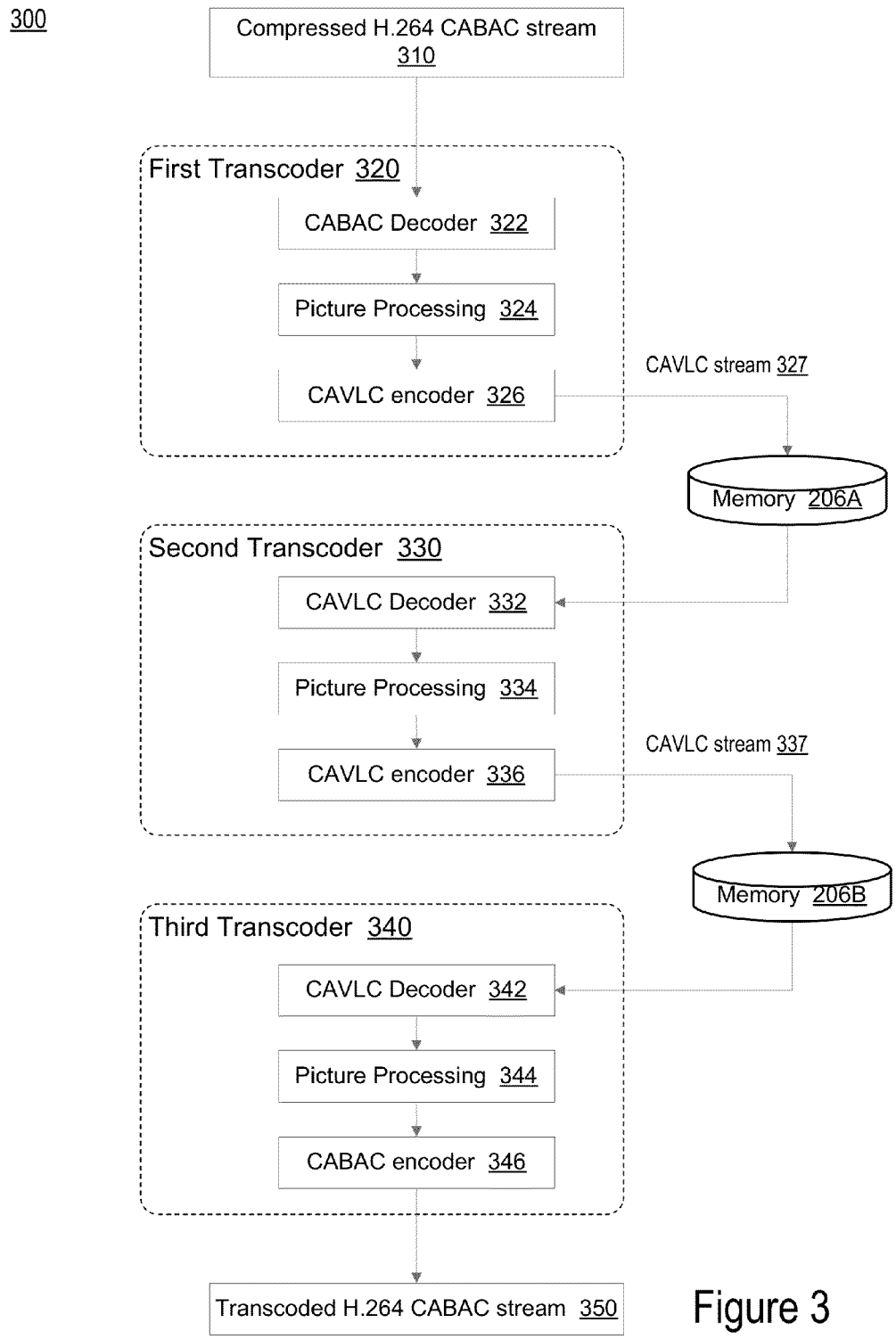
FIG. 3 is an example of the video processing system illustrated in FIG. 1 for transcoding a compressed H.264 CABAC stream into another H.264 CABAC stream by pipelining three transcoders.

FIG. 3 is an example of the video processing system 100 illustrated in FIG. 1 for transcoding a compressed H.264 CABAC stream 310 into another H.264 CABAC stream 350 by pipelining three transcoders. The exemplary video processing system in FIG. 3 comprises a first transcoder 320, a second transcoder 330 and a third transcoder 340. The first transcoder 320 couples the second transcoder 330, which couples the third transcoder 340. The first transcoder 320 is a pre-processing transcoder configured to preprocess the compressed H.264 CABAC stream 310 into a CAVLC stream 327. The second transcoder 330 is a primary transcoder configured to transcode the CAVLC stream 327 into a second CAVLC stream 337. The third transcoder 340 is a post-processing transcoder configured to transcode the second CAVLC stream 337 into the H.264 CABAC stream 350.

Turning to the individual elements of FIG. 3, the first transcoder 320 comprises a CABAC decoder 322, a picture processing unit 324 and a CAVLC encoder 326. The CABAC decoder 322 receives the compressed H.264 stream 310 in CABAC video format as its input stream. The CABAC decoder 322 decodes the input stream 310 using a CABAC decoding algorithm, such as the binary arithmetic decoding known to those of ordinary skills in the art. The decoded H.264 video stream comprises multiple intra and inter video frames. The picture processing unit 324 receives the video frames of the decoded H.264 CABAC stream and processes these video frames. In one embodiment, the picture processing unit 324 translates the received video frames into format that the CAVLC encoder 326 can use as input. The picture processing unit 324 sends the processed video frames to the CAVLC encoder 326. The CAVLC encoder 326 encodes the processed video frames into a CAVLC stream 327 (i.e., a bitstream in CAVLC video format) using a CAVLC encoding algorithm, such as structured Exp-Golomb encoding. The first transcoder 320 stores the CAVLC stream 327 in the memory 206A for further processing.

The second transcoder 330 comprises a CAVLC decoder 332, a picture processing unit 334 and a CAVLC encoder 336. The second transcoder 330 retrieves the CAVLC stream 327 from the memory 206A and sends it to the CAVLC decoder 332. The CAVLC decoder 332 decodes the CAVLC stream 327 using a CAVLC decoding algorithm, such as Exp-Golomb decoding. The decoded CAVLC stream comprises multiple intra and inter video frames. The picture processing unit 334 receives the intra/inter video frames of the decoded CAVLC stream 327 and processes these video frames. In one embodiment, the video processing unit 334 performs video processing including change of bit-rate, frame-rate and/or spatial resolution. The picture processing unit 334 sends the processed video frames to the CAVLC encoder 336. The CAVLC encoder 336 encodes the processed video frames into another CAVLC stream 337. The second transcoder 330 stores the CAVLC stream 337 in the memory 206B for further processing.

The third transcoder 340 comprises a CAVLC decoder 342, a picture processing unit 344 and a CAVLC encoder 346. The third transcoder 340 retrieves the CAVLC stream 337 from the memory 206B and sends it to the CAVLC decoder 342. The CAVLC decoder 342 decodes the CAVLC stream 337. The decoded CAVLC stream comprises multiple intra and inter video frames. The picture processing unit 344 receives the intra/inter video frames of the decoded CAVLC stream 337 and processes these video frames. In one embodiment, the picture processing unit 344 translates the received video frames into a format suitable for the CABAC encoder 346. The picture processing unit 344 sends the processed video frames to the CABAC encoder 346. The CABAC encoder 346 encodes the processed video frames into a H.264 CABAC stream 350, which is a transcoded video stream of the input stream 310, the H.264 CABAC stream. The third transcoder 340 can output the transcoded H.264 CABAC stream 350 to a next video processing unit (e.g., a video player), or store the H.264 CABAC stream 350 in a storage device.

As noted, the CAVLC decoder 332 of the second transcoder 330 is a decoder corresponding to (or complementing) the CAVLC encoder 326 of the first transcoder 320. The CAVLC decoder 332 is configured to decode the bitstream encoded by the CAVLC encoder 326. Similarly, the CAVLC decoder 342 of the third transcoder 340 is a decoder corresponding to the CAVLC encoder 336 of the second transcoder 330. The CAVLC decoder 342 is configured to decode the bitstream encoded by the CAVLC encoder 336.

As illustrate in FIG. 3, an input video stream 310 in a complex video format (e.g., H.264 CABAC) is first pre-processed by the first transcoder 320 and gets stored into the memory 206A. Pre-processing the input video stream 310 by the first transcoder 320 and storing into the memory 206A smooth out CABAC decoding jitters. It allows designing the CABAC decoder 322 for average bit-rate instead of peak bit-rate. Accordingly, the second transcoder 330 runs more efficiently and quickly given the CABAC decoder 322. As a result, the average video processing performance provided by pre-processing an input video stream is better than a worst scenario video processing performance without the pre-processing. Similarly, storing the CAVLC stream 327 into the memory 206B and post-processing the CAVLC 327 by the third transcoder 340 smooth out CABAC encoding jitters. It allows designing the CABAC encoder 346 for average bit-rate instead of peak bit-rate. This allows the second transcoder 320 to run more efficiently and quickly given the CABAC encoder 346.

FIG. 4 is an example of the video processing system 100 illustrated in FIG. 1 for transcoding a compressed H.264 CABAC stream 410 into a MPEG-2 video stream 440 by pipelining two transcoders. The exemplary video processing system in FIG. 4 comprises a first transcoder 420, a second transcoder 430 and a memory unit 206. The first transcoder 420 couples the second transcoder 430. The first transcoder 420 is a pre-processing transcoder configured to preprocess the compressed H.264 CABAC stream 410 into a CAVLC stream 427. The second transcoder 430 is a primary transcoder configured to transcode the CAVLC stream 427 into the MPEG-2 video stream 440.

Turning to the individual elements of FIG. 4, the first transcoder 420 comprises a CABAC decoder 422, a picture processing unit 424 and a CAVLC encoder 426. The CABAC decoder 422 receives the compressed H.264 stream 410 in CABAC video format as its input stream. The CABAC decoder 422 decodes the input stream 410 using a CABAC decoding algorithm, such as the binary arithmetic decoding. The decoded H.264 video stream comprises multiple intra and inter video frames. The picture processing unit 424 receives the video frames of the decoded H.264 CABAC stream and processes these video frames. In one embodiment, the picture processing unit 424 translates the received video frames into a format that the CAVLC encoder 426 understands. The picture processing unit 424 sends the processed video frames to the CAVLC encoder 426. The CAVLC encoder 426 encodes the processed video frames into a CAVLC stream 427 using a CAVLC encoding algorithm, such as structured Exp-Golomb encoding. The first transcoder 420 stores the CAVLC stream 427 in the memory 206 for further processing.

The second transcoder 430 comprises a CAVLC decoder 432, a picture processing unit 434 and a MPEG-2 video entropy encoder 436. The CAVLC decoder 432 is a decoder corresponding to (or complementing) the CAVLC encoder 426 of the first transcoder 420. The second transcoder 430 retrieves the CAVLC stream 427 from the memory 206 and sends it to the CAVLC decoder 432. The CAVLC decoder 432 decodes the CAVLC stream 427. The decoded CAVLC stream comprises multiple intra and inter video frames. The picture processing unit 434 receives the intra/inter video frames of the decoded CAVLC stream 427 and processes these video frames. In one embodiment, the picture processing unit 434 performs video processing including change of bit-rate, frame-rate and/or spatial resolution. The picture processing unit 434 sends the processed video frames to the MPEG-2 video entropy encoder 436. The MPEG-2 video entropy encoder 436 encodes the processed video frames into a transcoded MPEG-2 video stream 440. The second transcoder 430 can output the transcoded MPEG-2 video stream 440 to a next video processing unit (e.g., a video player), or store the MPEG-2 stream 440 in a storage device.

As illustrate in FIG. 4, an input video stream 410 in a complex video format (e.g., H.264 CABAC) is first pre-processed by the first transcoder 420. Pre-processing the input video stream 110 and storing the pre-processed input stream 410 into the memory 206 by the first transcoder 420 allows the second transcoder 430 to more efficiently and quickly transcode the input video stream 410. Pre-processing the input stream 410 by the first transcoder 420 and buffering the pre-processed input stream with the memory 206 allows for configuring the CABAC decoder 422 for average bit-rate rather than peak bit-rate. Thus, the second transcoder 430 runs more efficiently and quickly given the CABAC decoder 422.

Figure 5:
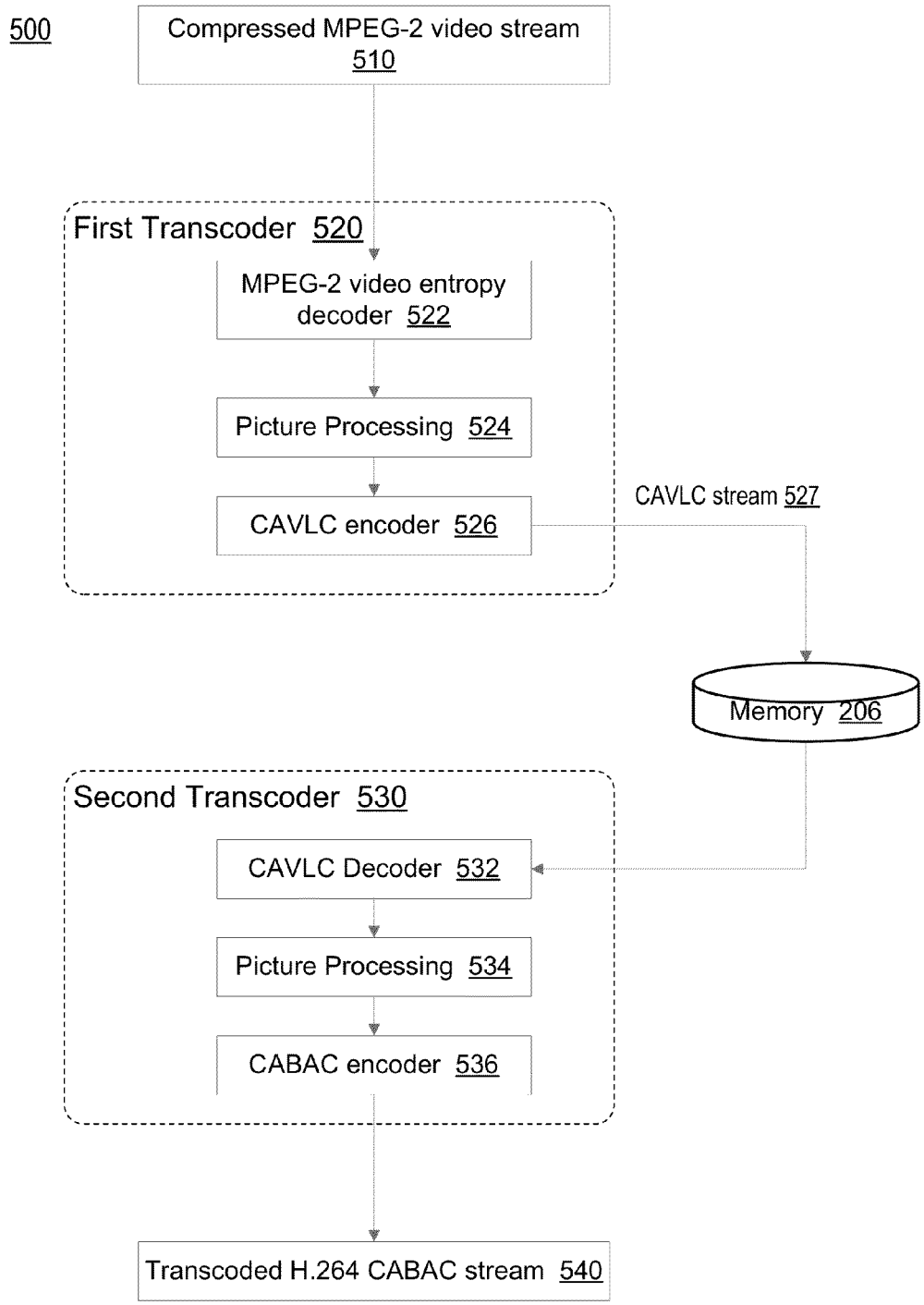
FIG. 5 is an example of the video processing system illustrated in FIG. 1 for transcoding a compressed MPEG-2 video stream into a H.264 CABAC stream by pipelining two transcoders.

FIG. 5 is an example of the video processing system 100 illustrated in FIG. 1 for transcoding a compressed MPEG-2 video stream 510 into a H.264 CABAC stream 540 by pipelining two transcoders. The exemplary video processing system in FIG. 5 comprises a first transcoder 520, a second transcoder 530 and a memory unit 206. The first transcoder 520 couples the second transcoder 530. The first transcoder 520 is a pre-processing transcoder configured to preprocess the compressed MPEG-2 stream 510 into a CAVLC stream 527. The second transcoder 530 is a primary transcoder configured to transcode the CAVLC stream 527 into the H.264 CABAC video stream 540.

Turning to the individual elements of FIG. 5, the first transcoder 520 comprises a MPEG-2 entropy decoder 522, a picture processing unit 524 and a CAVLC encoder 526. The MPEG-2 entropy decoder 522 receives the compressed MPEG-2 video stream 510 as its input stream. The MPEG-2 entropy decoder 522 decodes the input stream 510 using a MPEG-2 entropy decoding algorithm. The decoded MPEG-2 video stream comprises multiple intra and inter video frames. The picture processing unit 524 receives the video frames of the decoded MPEG-2 stream and processes these video frames. In one embodiment, the picture processing unit 524 performs video processing functions such as scaling and/or motion estimation on the decoded MPEG-2 frames. The picture processing unit 524 sends the processed video frames to the CAVLC encoder 526. The CAVLC encoder 526 encodes the processed video frames into a CAVLC stream 527. The first transcoder 520 stores the CAVLC stream 527 in the memory 206 for further processing.

The second transcoder 530 comprises a CAVLC decoder 532, a picture processing unit 534 and a CABAC encoder 536. The CAVLC decoder 532 is a decoder corresponding to (or complementing) the CAVLC encoder 526 of the first transcoder 520. The second transcoder 530 retrieves the CAVLC stream 527 from the memory 206 and sends it to the CAVLC decoder 532. The CAVLC decoder 532 decodes the CAVLC stream 527. The decoded CAVLC stream comprises multiple intra and inter video frames. The picture processing unit 534 receives the intra/inter video frames of the decoded CAVLC stream 527 and processes these video frames. In one embodiment, the picture processing unit 534 translates the received video frames into a format that the CABAC encoder 536 understands. The picture processing unit 534 sends the processed video frames to the CABAC encoder 536. The CABAC encoder 536 encodes the processed video frames into a transcoded H.264 CABAC stream 540. The second transcoder 530 can output the transcoded H.264 CABAC stream 540 to a next video processing unit (e.g., a video player), or store the H.264 CABAC stream 540 in a storage device.

As illustrate in FIG. 5, the first transcoder 520 transcodes the input video stream 510 to a CAVLC stream 527, and stores it into the memory 206. The second transcoder 530 reads the CAVLC stream 527 from the memory 206 and transcodes it into the CABAC stream 540. The memory 206 smoothes out the CABAC encoder 536 processing, and allows the first transcoder 520 to run more efficiently and quickly. In addition, the CABAC encoder 536 can be configured for average bit-rate instead of peak bit-rate. Thus, the first transcoder 520 runs more efficiently and quickly given the CABAC encoder 536.

Figure 6:
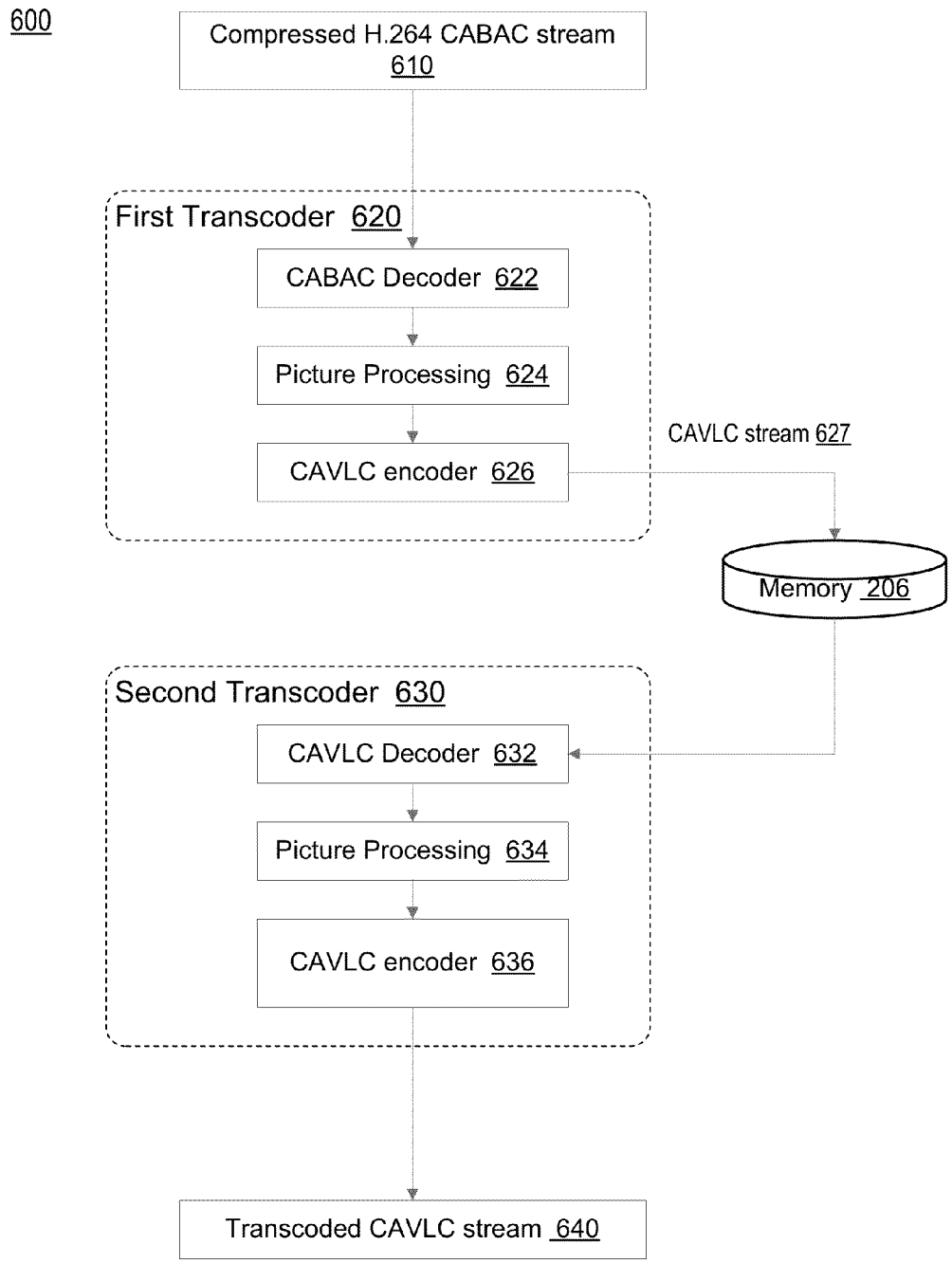
FIG. 6 is an example of the video processing system illustrated in FIG. 1 for transcoding a compressed H.264 CABAC stream into a CAVLC video stream by pipelining two transcoders.

FIG. 6 is an example of the video processing system 110 illustrated in FIG. 1 for transcoding a compressed H.264 CABAC stream 610 into a CAVLC stream 640 by pipelining two transcoders. The exemplary video processing system in FIG. 5 comprises a first transcoder 620, a second transcoder 630 and a memory unit 206. The first transcoder 620 couples the second transcoder 630. The first transcoder 620 is a pre-processing transcoder configured to preprocess the compressed H.264 CABAC stream 610 into a CAVLC stream 627. The second transcoder 630 is a primary transcoder configured to transcode the CAVLC stream 627 into the CAVLC stream 640.

Turning to the individual elements of FIG. 6, the first transcoder 620 comprises a CABAC decoder 622, a picture processing unit 624 and a CAVLC encoder 626. The CABAC decoder 622 receives the compressed H.264 CABAC stream 610 as its input stream. The CABAC decoder 622 decodes the input stream 610 using a CABAC decoding algorithm known to those of ordinary skills in the art. The decoded H.264 CABAC stream comprises multiple intra and inter video frames. The picture processing unit 624 receives the video frames of the decoded H.264 CABAC stream and processes these video frames. In one embodiment, the picture processing unit 624 translates received video frames into a format that can be used by the CAVLC encoder 626. The picture processing unit 624 sends the processed video frames to the CAVLC encoder 626. The CAVLC encoder 626 encodes the processed video frames into a CAVLC stream 627. The first transcoder 620 stores the CAVLC stream 627 in the memory 206 for further processing.

The second transcoder 630 comprises a CAVLC decoder 632, a picture processing unit 634 and a CAVLC encoder 636. The CAVLC decoder 632 is a decoder corresponding to (or complementing) the CAVLC encoder 626 of the first transcoder 620. The second transcoder 630 retrieves the CAVLC stream 627 from the memory 206 and sends it to the CAVLC decoder 632. The CAVLC decoder 632 decodes the CAVLC stream 627. The decoded CAVLC stream comprises multiple intra and inter video frames. The picture processing unit 634 receives the intra/inter video frames of the decoded CAVLC stream 627 and processes these video frames. In one embodiment, the picture processing unit 634 performs video processing functions such as scaling and/or motion estimation on the decoded CAVLC stream 627. The picture processing unit 634 sends the processed video frames to the CAVLC encoder 636. The CAVLC encoder 636 encodes the processed video frames into a transcoded CAVLC stream 640. The second transcoder 630 can output the transcoded CAVLC stream 640 to a next video processing unit (e.g., a video player), or store the CAVLC stream 640 in a storage device.

As illustrate in FIG. 6, an input video stream 610 in a relatively complex video format (e.g., CABAC) is first pre-processed by the first transcoder 620. The first transcoder 620 pre-processes the CABAC stream 610 into the CAVLC stream 627 and stores it in the memory 206. Pre-processing the input stream 610 and storing it into the memory 206 smooth out CABAC decoding jitters. The CABAC decoder 622 accordingly is configured for average bit-rate instead of peak bit-rate. Therefore, the second transcoder 630 runs more efficiently and quickly given the CABAC decoder 622.

Figure 7:
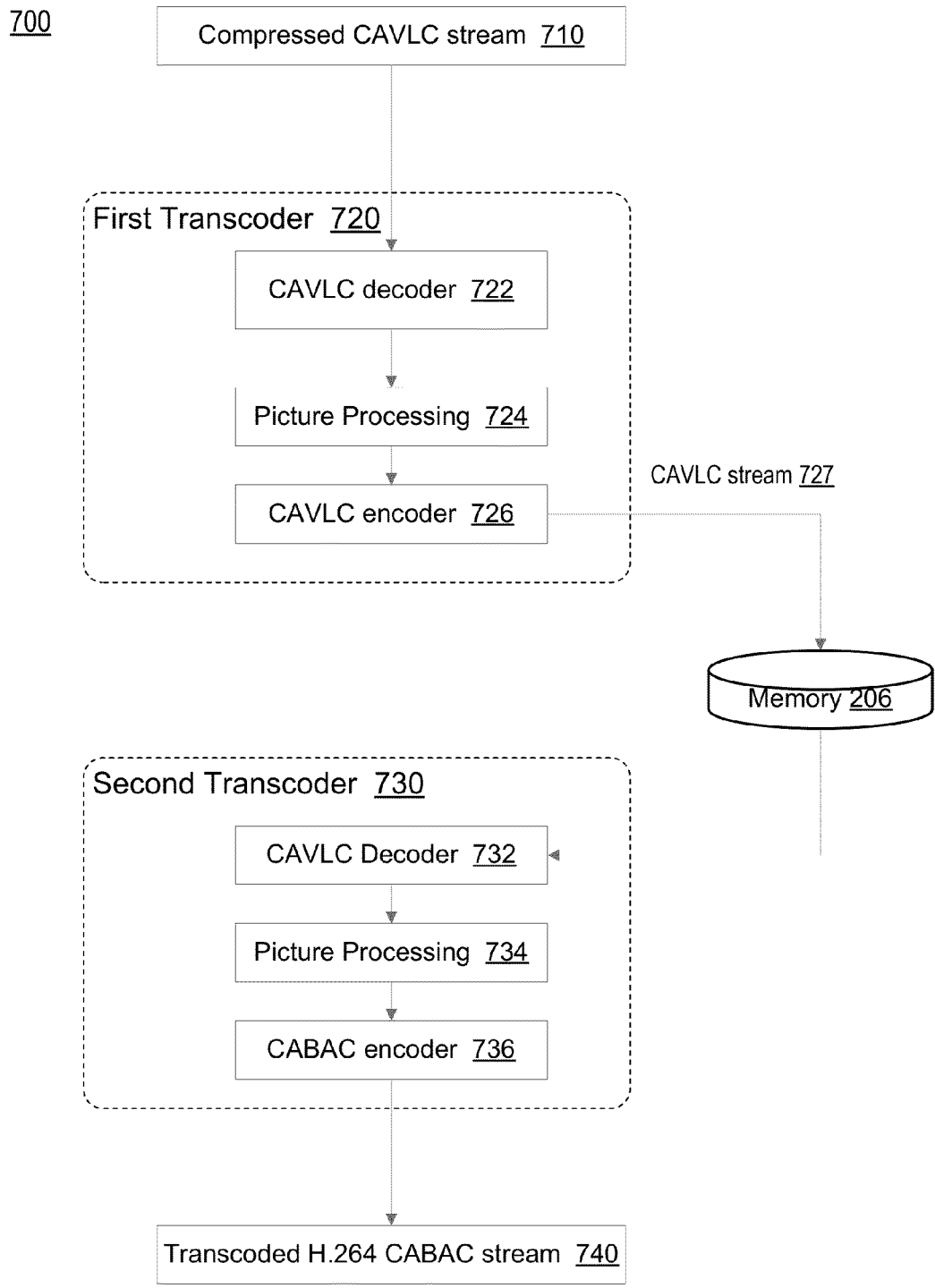
FIG. 7 is an example of the video processing system illustrated in FIG. 1 for transcoding a compressed CAVLC video stream into a H.264 CABAC stream by pipelining two transcoders.

FIG. 7 is an example of the video processing system 100 illustrated in FIG. 1 for transcoding a compressed CAVLC stream 710 into a H.264 CABAC stream 740 by pipelining two transcoders. The exemplary video processing system in FIG. 7 comprises a first transcoder 720, a second transcoder 730 and a memory unit 206. The first transcoder 720 couples the second transcoder 730. The first transcoder 720 is a pre-processing transcoder configured to preprocess the compressed CAVLC stream 710 into another CAVLC stream 727. The second transcoder 730 is a primary transcoder configured to transcode the CAVLC stream 727 into the H.264 CABAC stream 740.

Turning to the individual elements of FIG. 7, the first transcoder 720 comprises a CABAC decoder 722, a picture processing unit 724 and a CAVLC encoder 726. The CABAC decoder 722 receives the compressed CAVLC stream 710 as its input stream. The CAVLC decoder 722 decodes the input stream 710 using a CAVLC decoding algorithm known to those of ordinary skills in the art. The decoded CAVLC video stream comprises multiple intra and inter video frames. The picture processing unit 724 receives the video frames of the decoded CAVLC stream and processes these video frames. In one embodiment, the picture processing unit 724 performs video processing including change of bit-rate, frame-rate and/or spatial resolution. The picture processing unit 724 sends the processed video frames to the CAVLC encoder 726. The CAVLC encoder 726 encodes the processed video frames into a second CAVLC stream 727. The first transcoder 720 stores the CAVLC stream 727 in the memory 206 for further processing.

The second transcoder 730 comprises a CAVLC decoder 732, a picture processing unit 734 and a CAVLC encoder 736. The CAVLC decoder 732 is a decoder corresponding to the CAVLC encoder 727 of the first transcoder 720. The second transcoder 730 retrieves the CAVLC stream 727 from the memory 206 and sends it to the CAVLC decoder 732. The CAVLC decoder 732 decodes the CAVLC stream 727. The decoded CAVLC stream comprises multiple intra and inter video frames. The picture processing unit 734 receives the intra/inter video frames of the decoded CAVLC stream 727 and processes these video frames. In one embodiment, the picture processing unit 734 translates received video frames into a format that can be used by the CABAC encoder 736. The picture processing unit 734 sends the processed video frames to the CABAC encoder 736. The CABAC encoder 736 encodes the processed video frames into a transcoded H.264 CABAC stream 740. The second transcoder 730 can output the transcoded H.264 CABAC stream 740 to a next video processing unit (e.g., a video player), or store the H.264 CABAC stream 740 in a storage device.

As illustrate in FIG. 7, the first transcoder 720 transcodes the input video stream 710 into the CAVLC stream 727, and stores it into the memory 206. The second transcoder 730 reads the CAVLC stream 527 from the memory 206 and transcodes it into the CABAC stream 740. The memory 206 smoothes out the CABAC encoder 736 processing jitter, and allows the first transcoder 720 to run more efficiently and quickly. In particular, the CABAC encoder 736 can be configured for average bit-rate instead of peak bit-rate. This allows the first transcoder 720 to run more efficiently and quickly given the CABAC encoder 726.

Example Video Processing System Processing Flow

Figure 8:
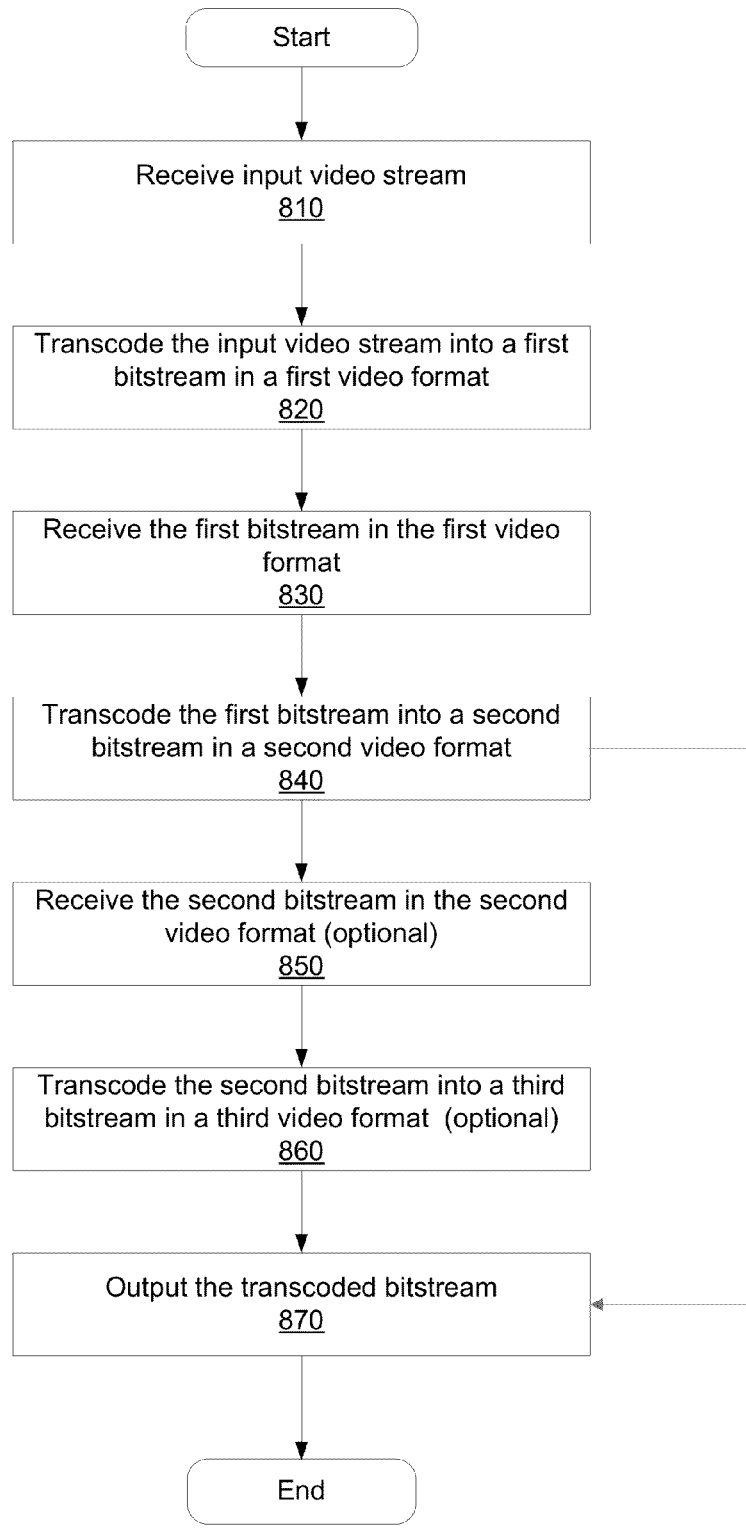
FIG. 8 is a flow chart illustrating steps performed by the video processing system to transcode a compressed video stream by pipelining multiple transcoders according to one embodiment.

FIG. 8 is a flow chart illustrating steps performed by the video processing system 110 to transcode a compressed video stream by pipelining multiple transcoders according to one embodiment. Initially, the video processing system 100 receives 810 an input video stream in its native video format. The video processing system 100 uses a first transcoder to transcode 820 the input video stream into a first bitstream in a first video format. A second transcoder of the video processing system 100 receives 830 the first bitstream in the first video format and transcodes 840 the first bitstream into a second bitstream in a second video format. The video processing system 100 optionally uses a third transcoder to further process the input video stream. For example, the third transcoder receives 850 the second bitstream in the second video format and transcodes 860 the second bitstream into a third bitstream in a third video format. The video processing system 100 further outputs 870 the transcoded bitstream. Responsive to having two transcoders, the video processing system 100 directly outputs 870 the bitstream after the bitstream is transcoded 840 by the second transcoder.

As noted above, the first transcoder of the video processing system 100 is a pre-processing transcoder (e.g., transcoder 120, 320, 420, 520, 620 or 720) configured to preprocess the input video stream into the first video stream in the first video format. The second transcoder (e.g., transcoder 140, 330, 430, 530, 630 or 730) is a primary transcoder configured to transcode the first video stream from the first transcoder into the second video stream in the second video format. Pre-processing the input video stream by the first transcoder allows the second transcoder to more efficiently and quickly transcode the input video stream into the second video stream in the second video format. The third transcoder comprises a post-processing transcoder that is configured to further transcode the second video stream from the second transcoder into a third video stream in a third video format. Post-processing the video stream from the second transcoder further improves processing efficiency and speed and also increases throughout of coding processing.

Additional Configuration Considerations

Some portions of above description describe the embodiments in terms of algorithmic descriptions and processes, e.g., as with the description within Figures XX. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving transcoding efficiency, speed and for increasing throughout of coding processing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A video processing system for transcoding an input video stream using pipelined transcoders, the system comprising:
a first transcoder configured to transcode the input video stream in its native video format into a first bitstream in a first video format, wherein the first transcoder comprises:
a first decoder configured to decode the input video stream into a first plurality of decoded video frames, and
a first context adaptive encoder configured to encode the first plurality of decoded video frames into the first bitstream in the first video format;
a computer storage configured to reduce decoding defects in the first bitstream and to store the first bitstream having reduced decoding defects;
a second transcoder coupled to the first transcoder and configured to retrieve the first bitstream having reduced decoding defects from the computer storage and to transcode the first bitstream having reduced decoding defects in the first video format into a second bitstream in a second video format, wherein the second transcoder comprises:

a first context adaptive decoder configured to decode the first bitstream having reduced decoding defects into a second plurality of decoded video frames, wherein the first context adaptive decoder corresponds to the first context adaptive encoder of the first transcoder, and a second context adaptive encoder configured to encode the second plurality of decoded video frames into the second bitstream in the second video format;

the computer storage configured to store the second bitstream, the second bitstream in the second video format having an average bitrate for further processing; and a third transcoder coupled to the second transcoder and configured to retrieve the second bitstream from the computer storage and to transcode the second bitstream in the second video format into a third bitstream in a third video format, wherein the third transcoder comprises:

a second context adaptive decoder configured to decode the second bitstream into a third plurality of decoded video frames, the second context adaptive decoder corresponding to the second context adaptive encoder of the second transcoder, and an encoder configured to encode the third plurality of decoded video frames into the third bitstream in the third video format, wherein the encoder corresponds to the first decoder of the first transcoder and the third bitstream has reduced encoding defects by using the first transcoder, the second transcoder and the third transcoder.

2. The system of claim 1, wherein the third transcoder further comprises a picture processing unit configured to process the third plurality of decoded video frames and send the third plurality of decoded video frames to the encoder of the third transcoder.

3. The system of claim 1, wherein the first transcoder further comprises a picture processing unit configured to process the first plurality of decoded video frames and send the first plurality of decoded video frames to the first context adaptive encoder.

4. The system of claim 1, wherein the second transcoder further comprises a picture processing unit configured to process the second plurality of decoded video frames and send the second plurality of decoded video frames to the second context adaptive encoder.

5. The system of claim 1, wherein the first decoder of the first transcoder is one of a group of video decoders comprising:
 a context-adaptive binary arithmetic coding (CABAC) decoder;
 a context-adaptive variable-length coding (CAVLC) decoder; and
 a moving picture experts group (MPEG)-2 video entropy decoder.

6. The system of claim 1, wherein the first context adaptive encoder of the first transcoder is one of a group of video encoders comprising:
 a context-adaptive binary arithmetic coding (CABAC) encoder; and
 a context-adaptive variable-length coding (CAVLC) encoder.

7. The system of claim 1, wherein the first context adaptive decoder of the second transcoder is one of a group of video decoders comprising:
 a context-adaptive binary arithmetic coding (CABAC) decoder; and
 a context-adaptive variable-length coding (CAVLC) decoder.

8. The system of claim 1, wherein the second context adaptive encoder of the second transcoder is one of a group of video encoders comprising:
 a context-adaptive binary arithmetic coding (CABAC) encoder; and
 a context-adaptive variable-length coding (CAVLC) encoder.

9. The system of claim 1, wherein the second context adaptive decoder of the third transcoder is one of a group of video decoders comprising:
 a context-adaptive binary arithmetic coding (CABAC) decoder; and
 a context-adaptive variable-length coding (CAVLC) decoder.

10. The system of claim 1, wherein:
 the input stream is a compressed H.264 context-adaptive binary arithmetic coding (CABAC) stream,
 the first transcoder comprises a context-adaptive binary arithmetic coding (CABAC) decoder and a context-adaptive variable-length coding (CAVLC) encoder,
 the second transcoder comprises a context-adaptive variable-length coding (CAVLC) decoder and a context-adaptive variable-length coding (CAVLC) encoder, and
 the second bitstream is a context-adaptive variable-length coding (CAVLC) stream.

11. The system of claim 1, wherein the encoder of the third transcoder is one of a group of video encoders comprising:
 a context-adaptive binary arithmetic coding (CABAC) encoder; and
 a context-adaptive variable-length coding (CAVLC) encoder.

12. A computer method for transcoding an input video stream using pipelined transcoders, the method comprising:
 transcoding, by a first transcoder, the input video stream in its native video format into a first bitstream in a first video format, wherein the first transcoder comprises:
  a first decoder configured to decode the input video stream into a first plurality of decoded video frames, and
  a first context adaptive encoder configured to encode the first plurality of decoded video frames into the first bitstream in the first video format;
 reducing decoding defects in the first bitstream and storing the first bitstream having reduced decoding defects in a computer storage;
 transcoding, by a second transcoder which is coupled to the first transcoder, the first bitstream having reduced decoding defects in the first video format into a second bitstream in a second video format, wherein the second transcoder comprises:
  a first context adaptive decoder configured to retrieve the first bitstream having reduced decoding defects from the computer storage and to decode the first bitstream having reduced decoding defects into a second plurality of decoded video frames, wherein the first context adaptive decoder corresponds to the first context adaptive encoder of the first transcoder, and
  a second context adaptive encoder configured to encode the second plurality of decoded video frames into the second bitstream in the second video format;
 storing the second bitstream in the computer storage, the second bitstream in the second video format having an average bitrate for further processing; and
 transcoding, by a third transcoder which is coupled to the second transcoder, the second bitstream in the second video format into a third bitstream in a third video format, wherein the third transcoder comprises:
a second context adaptive decoder configured to retrieve the second bitstream from the computer storage and to decode the second bitstream into a third plurality of decoded video frames, the second context adaptive decoder corresponding to the second context adaptive encoder of the second transcoder, and
an encoder corresponding to the first decoder of the first transcoder configured to encode the third plurality of decoded video frames into the third bitstream in the third video format, wherein the encoder corresponds to the first decoder of the first transcoder and the third bitstream has reduced encoding defects by using the first transcoder, the second transcoder and the third transcoder.

13. The method of claim 12, wherein the first transcoder further comprises a picture processing unit configured to process the first plurality of decoded video frames and send the first plurality of decoded video frames to the first context adaptive encoder.

14. The method of claim 12, wherein the second transcoder further comprises a picture processing unit configured to process the second plurality of decoded video frames and send the second plurality of decoded video frames to the second context adaptive encoder.

15. The method of claim 12, wherein the first decoder of the first transcoder is one of a group of video decoders comprising:
a context-adaptive binary arithmetic coding (CABAC) decoder;
a context-adaptive variable-length coding (CAVLC) decoder; and
a moving picture experts group (MPEG)-2 video entropy decoder.

16. The method of claim 12, wherein the first context adaptive encoder of the first transcoder is one of a group of video encoders comprising:
a context-adaptive binary arithmetic coding (CABAC) encoder; and
a context-adaptive variable-length coding (CAVLC) encoder.

17. A non-transitory computer-readable storage medium for transcoding an input video stream using pipelined transcoders, the computer-readable storage medium comprising:
a first transcoder configured to transcode the input video stream in its native video format into a first bitstream in a first video format, wherein the first transcoder comprises:
a first decoder configured to decode the input video stream into a first plurality of decoded video frames, and
a first context adaptive encoder configured to encode the first plurality of decoded video frames into the first bitstream in the first video format;
a computer storage configured to reduce decoding defects in the first bitstream and to store the first bitstream having reduced decoding defects;
a second transcoder coupled to the first transcoder and configured to retrieve the first bitstream having reduced decoding defects from the computer storage and to transcode the first bitstream having reduced decoding defects in the first video format into a second bitstream in a second video format, wherein the second transcoder comprises:
a first context adaptive decoder configured to decode the first bitstream having reduced decoding defects into a second plurality of decoded video frames, wherein the first context adaptive decoder corresponds to the first context adaptive encoder of the first transcoder, and
a second context adaptive encoder configured to encode the second plurality of decoded video frames into the second bitstream in the second video format;
the computer storage configured to store the second bitstream, the second bitstream in the second video format having an average bitrate for further processing; and
a third transcoder coupled to the second transcoder and configured to transcode the second bitstream in the second video format into a third bitstream in a third video format, wherein the third transcoder comprises:
a second context adaptive decoder configured to retrieve the second bitstream from the computer storage and to decode the second bitstream into a third plurality of decoded video frames, the second context adaptive decoder corresponding to the second context adaptive encoder of the second transcoder, and
an encoder corresponding to the first decoder of the first transcoder configured to encode the third plurality of decoded video frames into the third bitstream in the third video format, wherein the encoder corresponds to the first decoder of the first transcoder and the third bitstream has reduced encoding defects by using the first transcoder, the second transcoder and the third transcoder.

18. A video processing system for transcoding an input video stream using pipelined transcoders, the system comprising:
a first transcoder configured to transcode the input video stream in a first context-adaptive binary arithmetic coding (CABAC) video format into a first bitstream in a first a context-adaptive variable length coding (CAVLC) video format, wherein the first transcoder comprises:
a CABAC decoder configured to decode the input video stream into a first plurality of decoded video frames, and
a first CAVLC encoder configured to encode the first plurality of decoded video frames into the first bitstream in the first CAVLC video format;
a computer storage configured to reduce decoding defects in the first bitstream and to store the first bitstream having reduced decoding defects;
a second transcoder coupled to the first transcoder and configured to retrieve the first bitstream having reduced decoding defects from the computer storage and to transcode the first bitstream having reduced decoding defects in the first CAVLC video format into a second bitstream in a second CAVLC video format, wherein the second transcoder comprises:
a first CAVLC decoder configured to decode the first bitstream having reduced decoding defects into a second plurality of decoded video frames, wherein the first CAVLC decoder corresponds to the first CAVLC encoder of the first transcoder, and
a second CAVLC encoder configured to encode the second plurality of decoded video frames into the second bitstream in the second CAVLC video format;
the computer storage configured to store the second bitstream, the second bitstream in the second CAVLC video format having an average bitrate for further processing; and a third transcoder coupled to the second transcoder and configured to retrieve the second bitstream from the computer storage and to transcode the second bitstream in the second CAVLC video format into a third bitstream in a second CABAC video format, wherein the third transcoder comprises:
- a second CAVLC decoder configured to decode the second bitstream into a third plurality of decoded video frames, the second CAVLC decoder corresponding to the second CAVLC encoder of the second transcoder, and
- a CABAC encoder configured to encode the third plurality of decoded video frames into the third bitstream in the second CABAC video format, the third bitstream having reduced encoding defects by using the first transcoder, the second transcoder and the third transcoder.

\* \* \* \* \*